(12) United States Patent
Ariga

(10) Patent No.: US 6,791,717 B1
(45) Date of Patent: Sep. 14, 2004

(54) IMAGE PROCESSING APPARATUS FOR PERFORMING PSEUDO-HALFTONE PROCESSING AND IMAGE PROCESSING METHOD

(75) Inventor: Norimasa Ariga, Fujinomiya (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/383,566

(22) Filed: Aug. 25, 1999

(30) Foreign Application Priority Data

Aug. 28, 1998 (JP) .......................... 10-243669
Jul. 5, 1999 (JP) .......................... 11-190474

(51) Int. Cl.$^7$ .................... H04N 1/405; H04N 1/409
(52) U.S. Cl. .................... 358/2.1; 358/3.27; 358/3.21; 358/3.03; 358/3.13
(58) Field of Search ................ 358/1.9, 3.06, 358/3.13, 3.14, 3.15, 3.21, 3.03, 3.05, 3.27, 462, 2.1; 382/199, 176

(56) References Cited

U.S. PATENT DOCUMENTS

| | | | |
|---|---|---|---|
| 4,742,400 A | | 5/1988 | Tsuji |
| 5,023,919 A | | 6/1991 | Wataya |
| 5,231,677 A | | 7/1993 | Mita et al. |
| 5,430,557 A | * | 7/1995 | Tamura et al. ............. 358/3.06 |
| 5,539,541 A | | 7/1996 | Ushida |
| 5,666,443 A | | 9/1997 | Kumashiro |
| 5,745,596 A | * | 4/1998 | Jefferson .................... 382/199 |
| 6,480,302 B1 | * | 11/2002 | Kawano ...................... 358/2.1 |

FOREIGN PATENT DOCUMENTS

| | | |
|---|---|---|
| JP | 6-152947 | 5/1994 |
| JP | 6-276385 | 9/1994 |
| JP | 9-294208 | 11/1997 |
| JP | 10-42141 | 2/1998 |

* cited by examiner

Primary Examiner—Scott Rogers
(74) Attorney, Agent, or Firm—Frishauf, Holtz, Goodman & Chick, P.C.

(57) ABSTRACT

An image processing apparatus comprising an edge detection circuit which detects an edge from pixel data, a pseudo-halftone processing circuit which performs pseudo-halftone processing of the pixel data and outputs pseudo-halftone data, and a data synthesis circuit which synthesizes pixel data based on the pseudo-halftone data with the pseudo-halftone data at positions corresponding to the edge which the edge detection circuit detects to output the pseudo-halftone data having pixel data at the edge positions. With the apparatus applied, a print effected with the pseudo-halftone data has a high quality outline with no jaggedness.

14 Claims, 10 Drawing Sheets

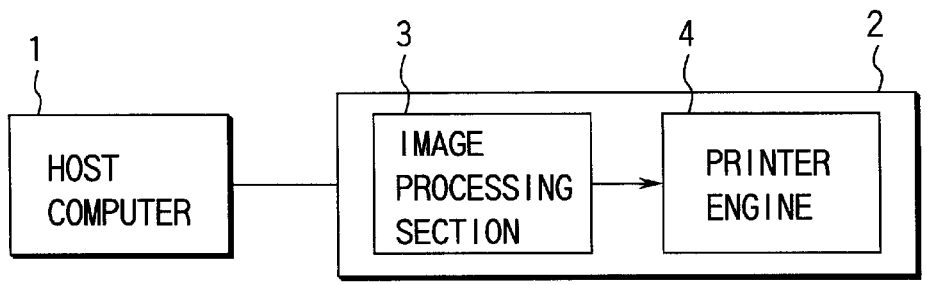
FIG. 1
| POSITION | FONT NAME | SIZE | DENSITY | CHARACTER CODE |
FIG. 2
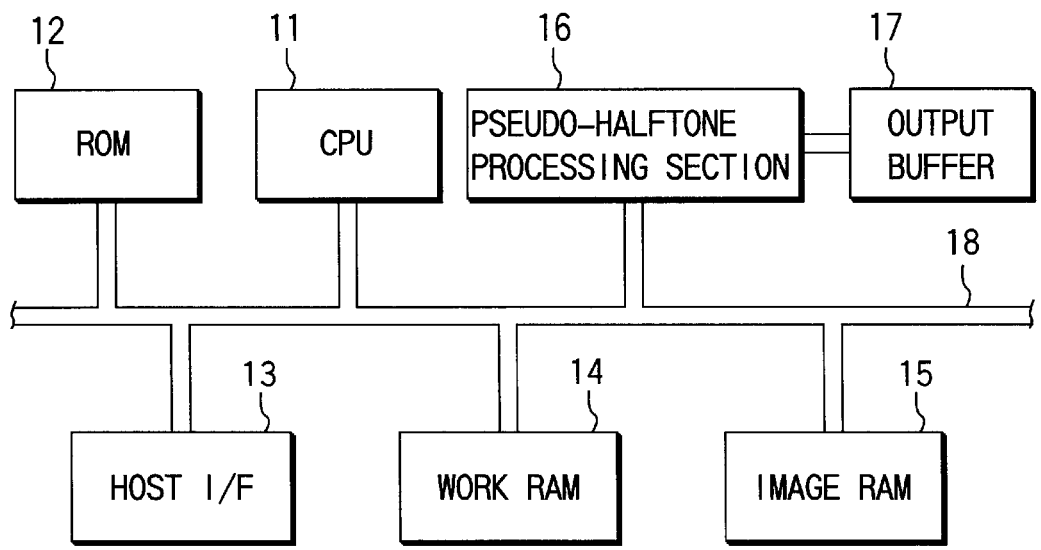
FIG. 3

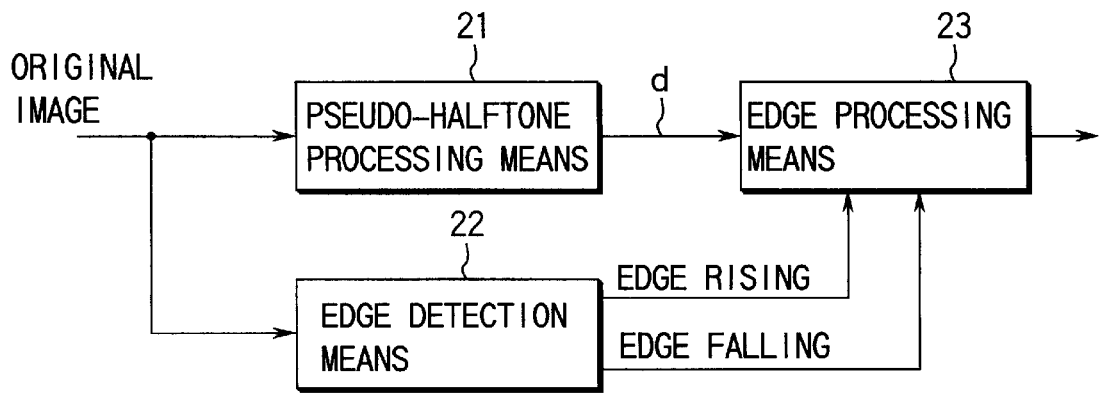
FIG. 4
FIG. 5A
FIG. 5B
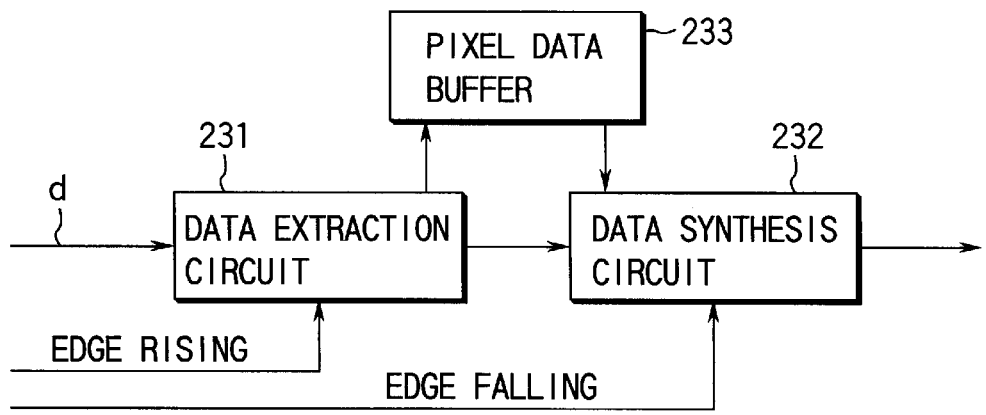
FIG. 6

|   | A | B | C | D | E | F | G | H |
|---|---|---|---|---|---|---|---|---|
| a | 0 | 0 | 0 | FF | 0 | 0 | 0 | 0 |
| b | 0 | 0 | 0 | 0 | 0 | 0 | FF | 0 |
| c | 0 | 0 | 0 | 0 | 0 | 0 | 0 | 0 |
| d | 0 | 0 | 0 | 0 | FF | 0 | 0 | 0 |

|   | A | B | C | D | E | F | G | H |
|---|---|---|---|---|---|---|---|---|
| a | 0 | 0 | 0 | 0 | 0 | 0 | FF | 0 |
| b | 0 | 0 | FF | 0 | 0 | 0 | 0 | 0 |
| c | 0 | 0 | 0 | 0 | 0 | 0 | 0 | 0 |
| d | 0 | 0 | FF | 0 | 0 | 0 | 0 | 0 |

| INPUT | $O_1$ | $O_2$ |
|---|---|---|
| 0 | 0 | 0 |
| 7F | 0 | 7F |
| FF | 7F | 7F |

|   | A | B | C | D | E | F | G | H |
|---|---|---|---|---|---|---|---|---|
| a | 0 | 0 | 0 | 0 | 0 | 0 | 0 | 0 |
| b | 0 | 0 | 0 | 7F | FF | 0 | 7F | 0 |
| c | 0 | 0 | 7F | 0 | 7F | 0 | 0 | 0 |
| d | 0 | 0 | 0 | 0 | 0 | 0 | 0 | 0 |

|   | A | B | C | D | E | F | G | H |
|---|---|---|---|---|---|---|---|---|
| a | 0 | 0 | 0 | 0 | 0 | 0 | 0 | 0 |
| b | 0 | 0 | 0 | FF | FF | 0 | 7F | 0 |
| c | 0 | 0 | 7F | 0 | FF | 0 | 0 | 0 |
| d | 0 | 0 | 0 | 0 | 0 | 0 | 0 | 0 |

| 30 | 24 | 20 | 10 | 18 | 21 | 25 | 31 |
|----|----|----|----|----|----|----|----|
| 27 | 13 | 6  | 1  | 2  | 7  | 11 | 16 |
| 15 | 9  | 5  | 4  | 3  | 8  | 14 | 28 |
| 29 | 23 | 19 | 17 | 12 | 22 | 26 | 32 |

| 0 | 10 % | 10 | 10 | 10 | 10 | 10 | 10 |
|---|---|---|---|---|---|---|---|
| 0 | 10 | 10 | 10 | 10 | 10 | 10 | 10 |
| 0 | 10 | 10 | 10 | 10 | 10 | 10 | 10 |
| 0 | 10 | 10 | 10 | 10 | 10 | 10 | 10 |
FIG. 25
| 0 | 0 | 0 | 0 | 0 | 0 | 0 | 0 |
|---|---|---|---|---|---|---|---|
| 0 | 0 | 0 | 100% | 100% | 0 | 0 | 0 |
| 0 | 0 | 0 | 0 | 100% | 0 | 0 | 0 |
| 0 | 0 | 0 | 0 | 0 | 0 | 0 | 0 |
FIG. 26
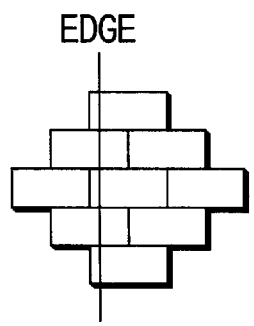
FIG. 27
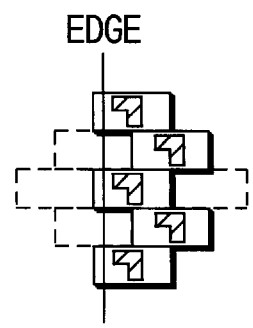
FIG. 28

IMAGE PROCESSING APPARATUS FOR PERFORMING PSEUDO-HALFTONE PROCESSING AND IMAGE PROCESSING METHOD

BACKGROUND OF THE INVENTION

The present invention relates especially to an image processing method which is applied to a printing machine for performing pseudo-halftone processing and an image processing apparatus.

In a case where a black character is printed by a Bi-level monochrome laser beam printer, a quality of a character print has been improved by smoothing processing. Smoothing processing is to conduct printing by placing interpolating dots at an edge portion of a character in order that an outline of the character and an line image is made to appear smooth.

However, when character printing with a medium density is conducted, there has been a problem of increase in level of edge jaggedness since pseudo-halftone processing using a dither matrix method or a error diffusion method is adopted in the medium density printing.

For example, when a character with a 32 level gray scale is printed with a Bi-level printer, there is a need for constructing a dither pattern with at least 32 pixels in 4 times 8 matrix, as shown in FIG. 23. For example, a case where a gray character [B] with a 10% density developed into a bitmap as shown in FIG. 24 is printed is considered, where such a dither pattern is employed. FIG. 25 is an enlarged view of 32 pixels in a p portion of the character [B] of FIG. 24 and each of values in the table indicates a density (%) of a pixel. When the p portion is subjected to pseudo-halftone processing while using a dither pattern shown in FIG. 23, a density of a pixel exceeds three values of the dither pattern: [1, 2 and 3], wherein a density 10% is equivalent to [3.2] in the 32 representation levels. Hence, outputs after the pseudo-halftone processing are such that only the three pixels of the 32 pixels of FIG. 25 have a density 100% as shown in FIG. 26 and thereby, only the three pixels are printed with a density 100% and the other 29 pixels are printed with a density 0%, in other words the other 29 pixels are not printed.

Focus attention here on an edge portion of the character. While the p portion of the gray character [B] with a density 10% is located at the second column from left, pixels in the edge portion at the second column from left are not printed but pixels inwardly located at the fourth and fifth columns from left are printed in an image of FIG. 26 which have been subjected to the pseudo-halftone processing. Therefore, for example, if dither patterns shown in FIG. 23 are arranged as shown in FIG. 27 in the vicinity of the edge portion of the gray character [B] with a density 10%, the edge portion is printed in a pattern shaded with oblique lines as shown in FIG. 28. That is, a problem arises since the edge outline which is originally a perfectly straight line is out of order to show jaggedness, which makes it impossible to express an exact edge.

On the other hand, a measure is conceived in which smoothing processing is conducted through a procedure such that an outline of a character which has been subjected to pseudo-halftone processing is detected by pattern matching and then a proper correction is applied to the pseudo-halftone processed image. Specially, for example, many of matching patterns each in 5×5 pixel matrix are stored in ROM and detection based on the matching patterns in the ROM is conducted to find matching patterns that coincide with an original image in 5×5 pixel matrix through comparison, replacement of pixels in the problematic edge image is achieved by the selected matching patterns for data correction, whereby smoothing processing is completed.

Such a method is, however, problematic since the number of gray scale levels is large, a volume of data constituting dither patterns is increased as the number of pixels of a dither pattern is increased and in addition, there is a requirement that dither patterns including all kinds of arrangement pattern must be prepared to secure matching and as a result a volume of data necessary for all of the dither patterns is further increased.

BRIEF SUMMARY OF THE INVENTION

Accordingly, it is an object of the present invention to provide a image processing apparatus which does not require a tremendous volume of data unlike pattern matching, which can be adapted to pseudo-halftone processing such as a dither method or an error diffusion method so that its versatility in application is improved, and which can improve a quality of edge printing for a character and a line image after pseudo-halftone processing is conducted.

The present invention is directed to an image processing apparatus comprises detection means for detecting an edge from pixel data having a given first number of gray scale levels; processing means for performing pseudo-halftone processing of the pixel data to output pseudo-halftone data having a second number of gray scale levels lower than the first number of gray scale levels; and synthesis means for synthesizing pixel data based on the pseudo-halftone data outputted by the processing means with the pseudo-halftone data at positions corresponding to the edge that is detected by the edge detection means to output the pseudo-halftone data having pixels of the pixel data which distribute over the positions corresponding to the edge of the pixel data.

With this configuration, the present invention detects an edge position of an original image in pseudo-halftone data which are dispersed without any relationship with the original edge positions and by performing synthesis of pixels according to a result of the detection, pixels of the pseudo-halftone data are distributed at positions corresponding to the edge position of the original image. With such a procedure implemented, pixels are distributed at positions corresponding to the edge position of the original image, which is a result of pseudo-halftone processing. There can be provided, therefore, an image processing apparatus by which high quality printing is realized with no jaggedness on the outline of a printed character.

Besides, in an image processing method of the present invention as well, high quality printing can be achieved according to the steps constituted of the same features as described above.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an overall configuration of a printing system illustrating a first embodiment of the present invention;

FIG. 2 is a diagram of a format of print data of a character from a host computer in the first embodiment;

FIG. 3 is a block diagram showing a configuration of an image processing section of the first embodiment;

FIG. 4 is a block diagram showing a configuration of a pseudo-halftone processing section in the image processing section of FIG. 3;

FIG. 5A is an illustration of an example of pixel data of an original image inputted to the pseudo-halftone processing section of FIG. 4;

FIG. 5B is an illustration of an example of pixel data after application of pseudo-halftone processing outputted from the pseudo-halftone processing section of FIG. 4;

FIG. 6 is a block diagram showing a configuration of edge processing means in the pseudo-halftone processing section of FIG. 4;

FIG. 25 is an illustration of pixel data in density of a portion of the characters of FIG. 24;

FIG. 26 is an illustration of pixel data in density after the pixel data of FIG. 25 is subjected to pseudo-halftone processing in which the dither pattern of FIG. 23 is used;

FIG. 27 is an illustration of an arrangement example for a dither pattern; and

FIG. 28 is an illustration of an example of a conventional print of an edge portion of a pseudo-halftone character.

DETAILED DESCRIPTION OF THE INVENTION

Figure 7:
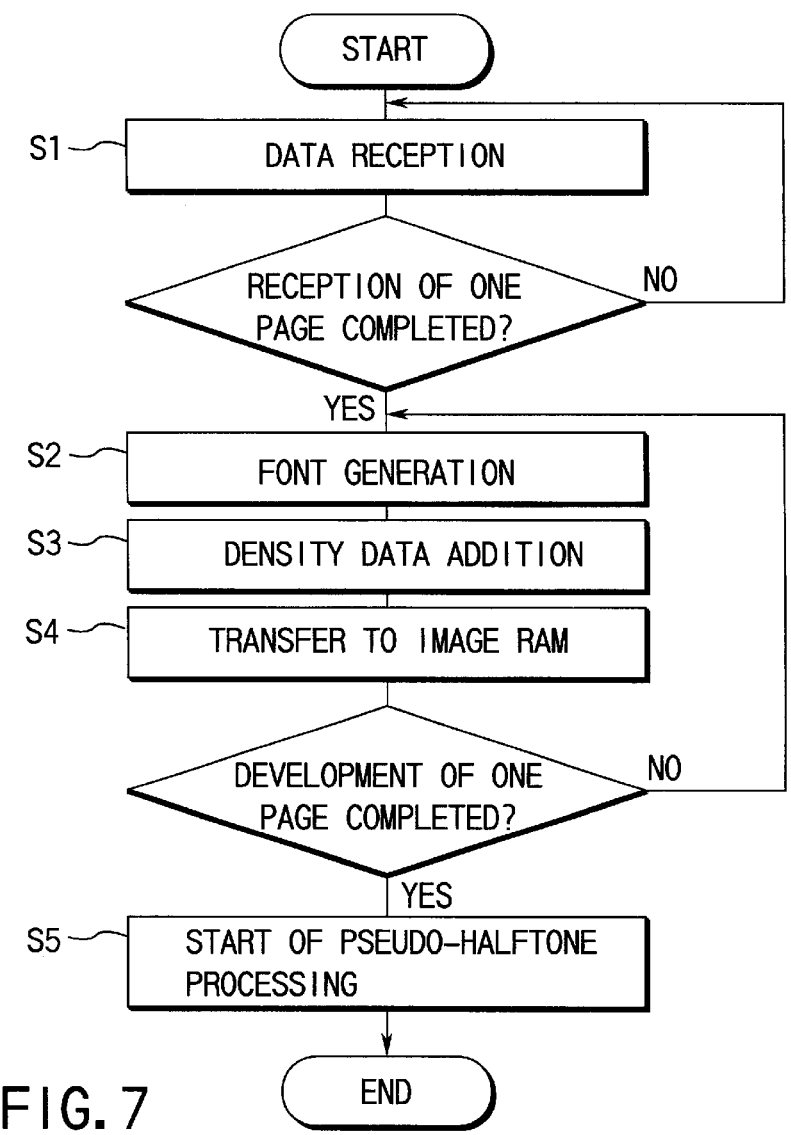
FIG. 7 is a flow chart showing data processing of the image processing section in the first embodiment.

Embodiments of the present invention will be described with reference to the accompanying drawings. The present invention is applied in a printing system in the embodiments.

[First Embodiment]

The embodiment is a case where a dither method is employed in pseudo-halftone processing. FIG. 1 is a block diagram showing an overall configuration of a system, wherein a numeral reference 1 indicates a host computer for generating print data or outputting print data supplied externally and a numeral reference 2 indicates a printing machine.

The printing machine 2 is constructed by an image processing section 3 and a printer engine 4, wherein the image processing section 3 processes image data inputted from the host computer 1 through a host computer interface to develop into a bitmap and the bitmap data are outputted to the printer engine 4 through an engine interface.

The printer engine 4 drives a printer mechanism such as a print head based on data developed over a bitmap from the image processing section 3 and performs dot-printing on a sheet of paper.

Character print data from the host computer 1 is composed of various kinds of information such a printing position, a font name, a font size and a character density, character code and the image processing section 3 develops the print data into a bitmap based on the information.

The image processing section 3, as shown in FIG. 3, is constructed by CPU (central processing unit) 11 which constitutes a control section body, ROM (read only memory) 12 in which program data and the like are stored on which programs the CPU 11 controls sections for image processing, a host computer interface 13 for transmitting data to and receiving data from the host computer 1, a work RAM (random access dram) 14, an image RAM 15, a pseudo-halftone processing section 16, and an output buffer 17, wherein CPU 11, ROM 12, the host computer interface 13, the work RAM 14, the image RAM 15 and the pseudo-halftone processing section 16 are electrically connected to one another by a bus line 18 and the output buffer 17 is directly connected to the pseudo halftone processing section 16.

The CPU 11 performs processing shown in FIG. 7 based on program data of the ROM 12. That is, in S1, character data for printing which is transmitted from the host computer 1 through the host computer interface 13 is received and the received character data are sequentially stored in the work RAM 14. When reception of character data for one page is completed, in S2 a bitmap font for each character is generated based on a font name, size and code of character data.

Subsequently, in S3, character data are added with density information and thereby, data of one bit per one pixel are converted to data of one byte per one pixel and thereafter, the character data are stored in the work RAM 14 at a predetermined address. Data of one byte per one pixel stored in the work RAM 14 are transferred to an proper address in the image RAM 15, which is a page buffer, so that the transferred data coincide with a printing position.

When one page of character data have been developed in the image RAM 15, in S5, operation of the pseudo-halftone processing 16 gets started. The pseudo-halftone processing section 16 performs pseudo-halftone processing by sequentially reading character data stored in the image RAM 15 as image data according to addresses and the result of processing is stored in the output buffer 17. The output buffer 17 is used for synchronization of data transmission to the printer engine 4 and rearrangement of data. The printer engine 4 performs dot-printing based on data stored in the output buffer 17.

The pseudo-halftone processing 16, as shown in FIG. 4, is constructed by a pseudo-halftone processing means 21, edge detection means 22 and edge processing means 23 and an original image stored in the image RAM15 is subjected to pseudo-halftone processing by the pseudo-halftone processing means 21 every one line. When the pseudo-halftone processing means 21 performs pseudo-halftone processing, for example, in a dither pattern shown in FIG. 23, an output is [1=FF] if a pixel density of the original image data is larger than a threshold of the dither pattern corresponding to the pixel while an output is [0] if a pixel density is equal to or smaller than the threshold. Therefore, for example, when original image data has contents shown in FIG. 5A, output data have contents shown in FIG. 5B. The pseudo-halftone processing section 16 supplies pixel data d to the edge processing means 23 after the original image data has been subjected to the pseudo-halftone processing in the pseudo-halftone processing means 21.

The edge detection means 22 detects an edge of a character from original image data. That is, a preceding pixel of the original image stored in the image RAM 15 is compared with a reference pixel and no outputting is effected if no change is existent in the comparison while an edge rising signal or an edge falling signal is outputted if any change appears.

For example, in the original image data of FIG. 5A, since data is [0] in the case where a reference pixel is B-a, and A-a of the preceding pixel which is the same as B-a is [0], no signal is outputted. Then when a reference pixel position is moved to an adjacent pixel C-a, an edge rising signal is outputted since the data is [1A] and a immediately preceding pixel B-a is [0]. When a reference pixel position is sequentially moved and an reference pixel is changed from G-a to H-a, an edge falling signal is outputted since the data is [0] and an immediately preceding pixel G-a is [1A]. Edge rising and falling signals from the edge detection means 22 are supplied to the edge processing means 23.

The edge processing means 23, as shown in FIG. 6, is constructed by data extraction circuit 231 which is data extracting means, data synthesis circuit 232 which is a data synthesis means, and a pixel data buffer 233, wherein an pixel data d on which pseudo-halftone processing has been finished by the pseudo-halftone processing means 21 is supplied to the data extraction circuit 231. Not only is an edge rising signal from the edge detection means 22 supplied to the data extraction circuit 231, but an edge falling signal is supplied to the data synthesis circuit 232. Accordingly, in the data extraction circuit 231, the position of a pixel, whose edge portion is detected and pixel data, whose position is the same, and on which pseudo-halftone processing has been finished, can be detected.

Figure 8:
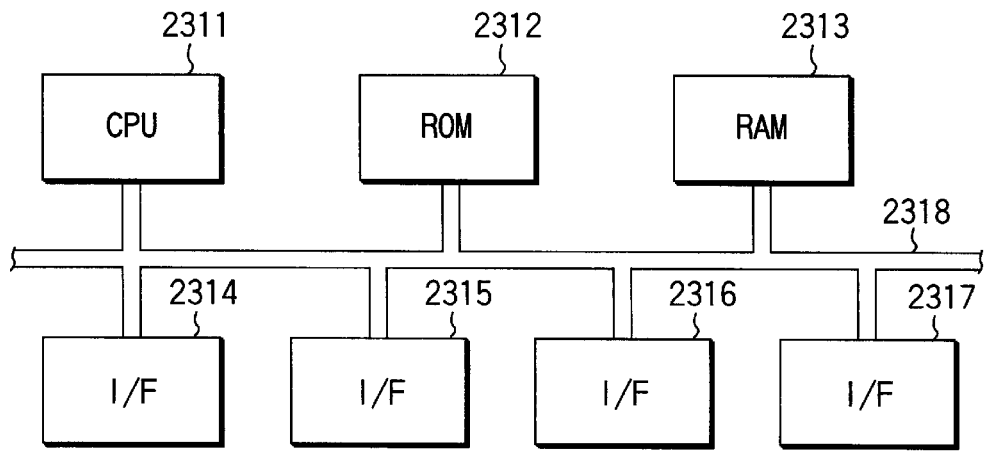
FIG. 8 is a block diagram showing a configuration of a data extraction circuit of FIG. 6.

The data extraction circuit 231, as shown in FIG. 8, is constructed by CPU (a central processing unit), 2311, ROM (read only memory) 2312 in which program data on which the CPU 2311 controls sections for image processing are stored, RAM (random access memory) 2313, I/F (interface) 231 for receiving pixel data which has been subjected to pseudo-halftone processing, I/F 2315 for receiving a edge rising signal, I/F 2316 for outputting pixel data to the pixel data buffer 233, and I/F 2317 for outputting pixel data to the data synthesis circuit 232, wherein the constituents are electrically connected to one another by a bus line 2318.

Figure 9:
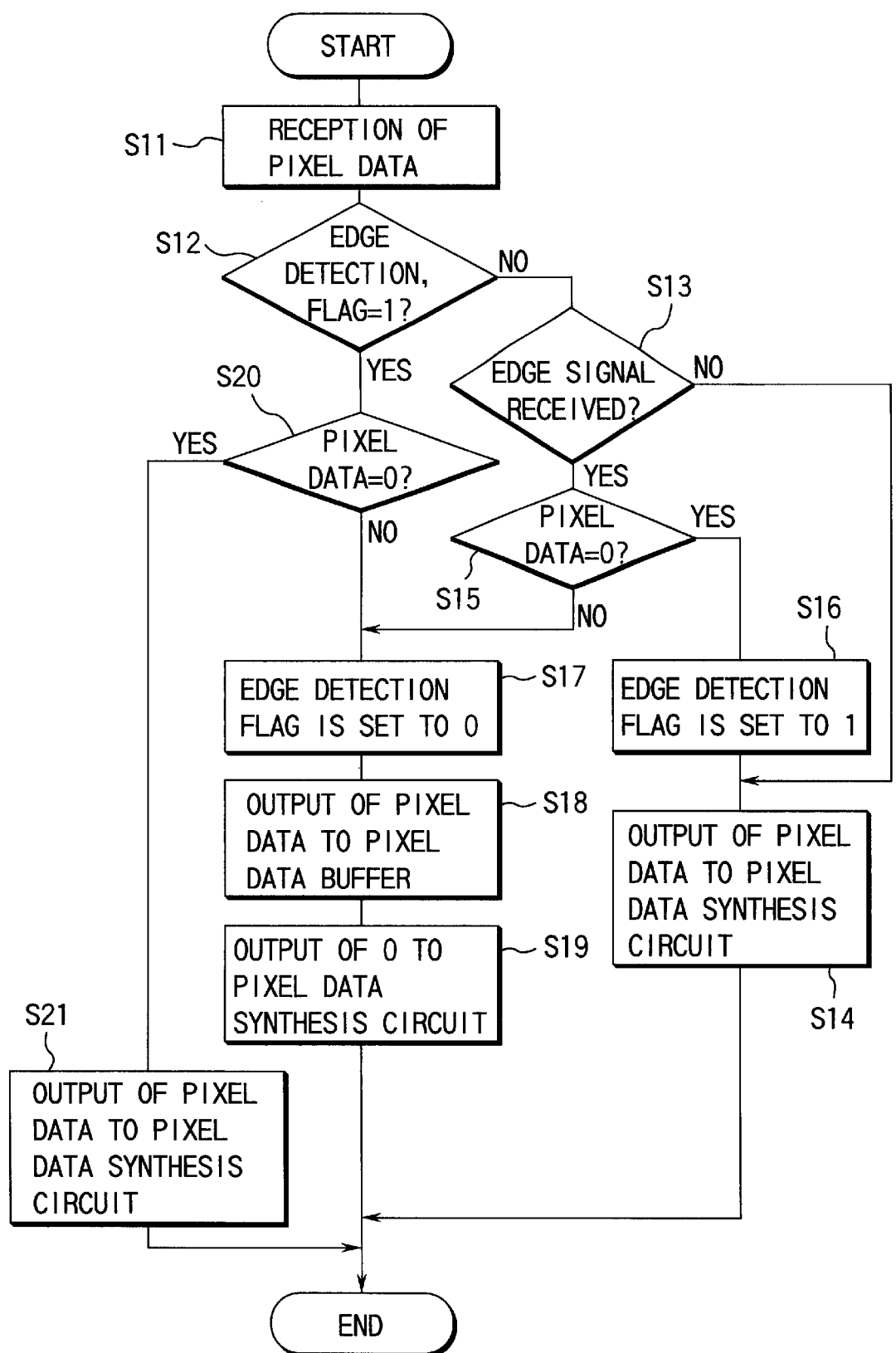
FIG. 9 is a flow chart showing data processing of the data extraction circuit of FIG. 6.

The CPU 2311 performs processing shown in FIG. 9 based on program data of ROM 2312. That is, first of all, in S11 when the CPU 2311 receives pixel data from I/F 2314 which receives pixel data which has been subjected to pseudo-halftone processing, in S12 the CPU 2311 investigates an edge detection flag in RAM 2313. The edge detection flag indicates whether or not an edge rising signal has been received and its initial state indicates [0] and when an edge rising signal is received, the flag is set to [1].

If the edge detection flag is [0], in S13 it is investigated whether or not the edge rising signal has been received though I/F 2315 which receives the edge rising signal since the edge rising signal has still not received. If not received, in S14 pixel data which has been received from I/F 2314 which receives a pixel data which has been subjected to the pseudo-halftone processing is outputted to the data synthesis circuit 232 through I/F 2317.

Further, in S13 if reception of the edge rising signal is recognized, in S15 a pixel data received from I/F 2314 is investigated. If a density of the pixel data is [0], in S16 the edge detection flag is set to [1] and in S14 the pixel data is outputted to the data synthesis circuit 232 through I/F 2317. If the pixel is not [0], in S17 the edge detection flag is set to [0], in S18 the pixel data is outputted to the pixel data buffer 233 through I/F 2316, further in S19 the pixel data is converted to [0] and thereafter, the pixel data is outputted to the data synthesis circuit 232 through I/F 2317.

Further, in S12 if the edge detection flag has been set to [1], in S20 pixel data received from I/F 2310 is investigated. If a density of the pixel data is [0], in S21 the pixel data is outputted to the data synthesis circuit 232 through I/F 2317. On the other hand, if the pixel data is not [0], in S17 the edge detection flag is set to [0], in S18 the pixel data is outputted to the pixel data buffer 233 through I/F 2316, further in S19 the pixel data is converted to [0] and thereafter the pixel data is outputted to the data synthesis circuit 232 through I/F 2317.

Accordingly, for example, when a pixel [1A] of C-b of FIG. 5A as an original image is inputted to the pseudo-halftone processing means 21 and the edge detection means 22, the pixel is converted to a pixel [0] of C-b of FIG. 5B in the pseudo-halftone processing means 21 and further inputted to the data extraction circuit 231 of the edge processing means 23. At the same time, edge rising of the pixel data is detected in the edge detection means 22 and the edge rising signal is inputted to the data extraction circuit 231. While the data extraction circuit 231 detects the pixel data C-b at an edge position which has been subjected to the pseudo-halftone processing by the edge rising signal, since the pixel data is [0], the pixel data is directly outputted to the data synthesis circuit 232 and then it is detected whether or not the next pixel data is an output pixel. Since the next pixel data is an output pixel [FF], the next pixel data is outputted to the pixel data buffer 233 and instead, the next pixel data is converted to a pixel data of a density [0] and then outputted to the data synthetic circuit 232.

Since the still next pixel data E-b is an output pixel [FF] and at this point, there is no output of an edge rising signal from the edge detection means 22, the data extraction circuit 231 directly outputs the pixel data E-b [FF] to the data synthesis circuit 232. In such a manner, the edge processing means 232 performs processing at pixel positions while sequentially moving from a pixel position to the next and when processing goes from G-b to H-b of the original image, an edge falling signal is supplied to the data synthesis circuit 232 from the edge detection means 22. As a result, the data synthetic circuit 232 outputs a pixel data [FF] which has the sum of an image data "0" outputted from the data extraction circuit 231 and the data [FF] stored in the pixel data buffer 233. Since there is a delay of one pixel in processing between the data extraction circuit 231 and data synthesis circuit 232, a pixel data [FF] outputted from the data synthesis circuit 232 is to be data of a pixel G-b though edge falling is detected in the edge detection means 22 when a pixel H-b of an original image is inputted.

As scribed above, pixels of the original image are sequentially processed while processing is moved from a pixel to the next and when one line of pixels are finished with the processing, the next line of pixels enter the processing. At the turn from one line to the next line, a direction of pixel processing on a line is reversed from the preceding one. That is, processing on new line gets started from the pixel side at the end of the preceding line. Since a direction of pixel processing is alternately reversed each time when processing on a new line of pixels gets started, output pixels [FF] are prevented from concentrating only at one end side.

Figures 10, 11, 12:
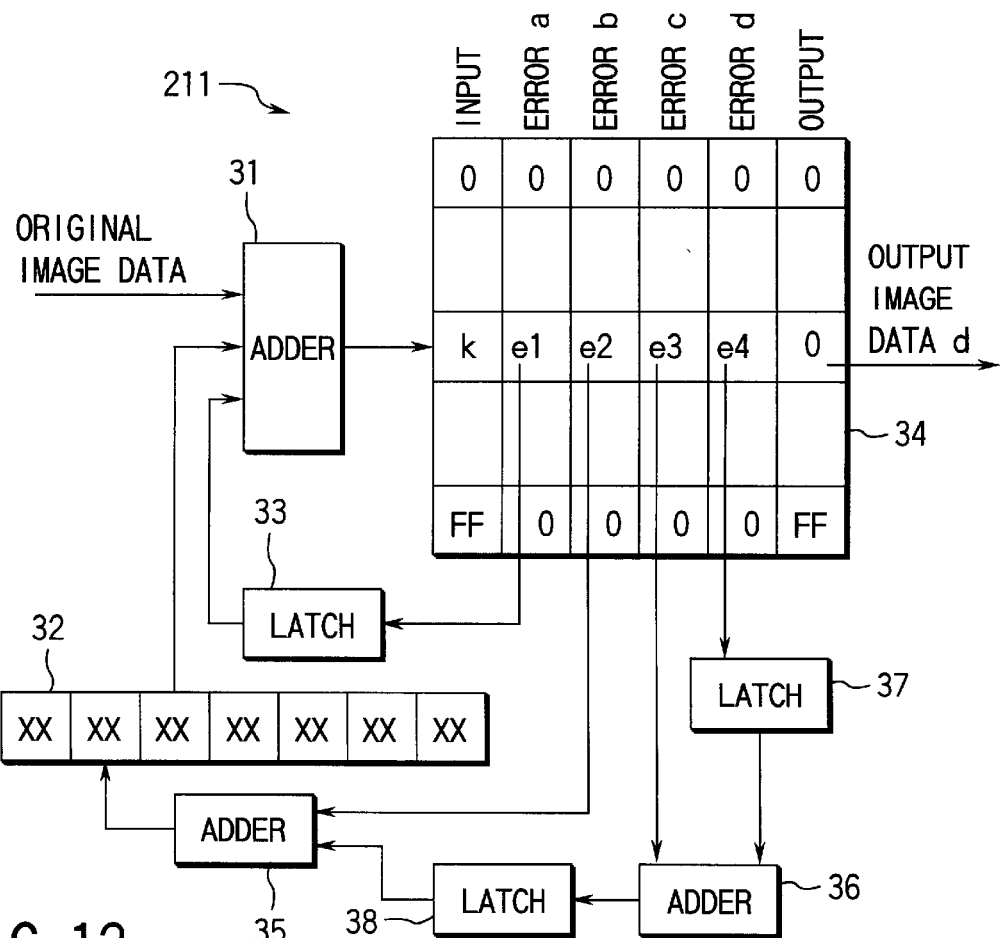
FIG. 10 is an illustration of an example of output pixels of the pseudo-halftone processing section in the image processing section of the first embodiment.
FIG. 11 is an illustration of a data format in a case where print data from the host computer is graphics in the first embodiment.
FIG. 12 is a block diagram showing a configuration of pseudo-halftone processing means of a pseudo-halftone section in a second embodiment of the present invention.

When processing is performed in such a manner, the pseudo-halftone processing section 16 outputs pixel data shown in FIG. 10 with input of original image data shown in FIG. 5A. That is, a pixel data at a pixel position G-b is [FF] in the b line of pixels and a pixel data at a pixel position C-c is a pixel data [FF] in the c line of pixels. Hence, pixel positions of output pixels correspond to the true edge positions of the original image.

Pixel data which have been subjected to the pseudo-halftone processing in the pseudo-halftone processing section 16 are sequentially stored into the output buffer 17 and when processing of one page of pixel data is completed, data which are stored in the output buffer 17 are outputted to the printer engine 4 as data stream in a specified output format to the printer engine 4 after conversion. The printer engine 4, thus, performs dot-printing on a sheet of paper driving a print head.

As described above, since output pixels can be possibly located at positions corresponding to edge positions of an original image, when an original image is subjected to pseudo-halftone processing in the pseudo-halftone processing section 16, edge portions of an original image can be reconstructed with high accuracy and no jaggedness to be conspicuous when printing characters and line images and thereby, a quality of edge printing can be improved. Besides, there arises no necessity to store a tremendous volume of data as in the case of pattern matching.

In the means time, the case where print data are characters are here described as an example. However, when print data from the host computer 1 are composed of various kinds of information such as a printing position, ID of graphics, a density and a moving point shown in FIG. 11, since the image processing section 3 can develop print data of graphic into bitmaps, the section 3 can be applied to processing of an edge of a picture. Further, by mixing character information and graphics information, an edge image quality can be improved even in printing where characters and graphics are coexistent in mixture.

In the mean time, in the embodiment, while a moving direction of pseudo-halftone processing on pixels of an original image data is alternately reversed for each line of pixels in the pseudo-halftone processing section 16, there is no specific limitation to this mode, but a pseudo-halftone processing direction may be reversed at every two line or every three line of pixels: a pseudo-halftone processing direction may be reversed regularly at any frequency of every line and every more than one line.

[Second Embodiment]

In the embodiment, description will be made of the case where an error diffusion method is employed in pseudo-halftone processing. An overall hardware configuration is basically same as in the case of the first embodiment, only with the exception that a configuration of the pseudo-halftone processing means in FIG. 4 is different.

A pseudo-halftone processing means 211 in the embodiment, as shown in FIG. 12, is provided with a first adder 31 and the first adder 31 is provided with original image data, an error from a preceding line which has been read by an error buffer 32 and an error from a left adjacent pixel outputted from a first latch circuit 33. The first adder 31 adds the error from the error buffer 32 and the error from the first latch circuit 33 to the original image and the result is used as an input value to a look-up table 34.

Figures 13, 14, 15:
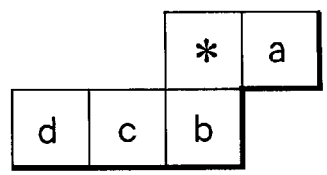
FIG. 13 is an illustration of examples of error distribution coefficients used in the pseudo-halftone processing means of the second embodiment.
FIG. 14 is an illustration of an example of pixel data inputted to an edge processing means in the pseudo-halftone processing section of the second embodiment.
FIG. 15 is an illustration of an example of pixel data outputted from an edge processing means in the pseudo-halftone processing section of the second embodiment.

In the look-up table 34, as shown in FIG. 13, errors e1, e2, e3 and e4 which are distributed according to the following error distribution coefficients for important pixels are stored: a (for example, 5/10), b (for example, 3/10), c (for example, 1/10) and d (for example, 1/10) and the errors are distributed to other pixels through the error buffer 32 and the like. That is, the look-up table 34 supplies the error e1 which is distributed according to the error distribution coefficient a to the first latch circuit 33, the error e2 which is distributed according to the error distribution coefficient b to a second adder 35, the error e3 which is distributed according to the error distribution coefficient c to a third adder 36 and the error e4 which is distributed according to the error distribution coefficient d to a second latch circuit 37.

Further, the error e4 which is latched in the second latch circuit 37 is supplied to the third adder 36, the error e3 and the error e4 are added to each other in the third adder 36 and the addition result is supplied to the third latch circuit 38. The error which is latched in the third latch circuit 38 is supplied to the second adder 35, the error e2 and an error from the latch circuit 38 are added to each other in the adder 35 and the addition result is stored in the error buffer 32.

The look-up table 34 uses data from the first adder 31 as an input value and determines output pixel data d, which has been subjected to the pseudo-halftone processing, according to the contents of the table and further supplies the pixel data d to the edge processing means 23.

Since such a pseudo-halftone processing means 211 is employed, for example when original image data as shown in FIG. 5A is inputted to the means 211, the means 211 outputs an output pixel data d as shown in FIG. 14 which is converted from the original image data through the pseudo-halftone processing to the edge processing means 23. In the edge processing means 23, as in the first embodiment, pixel data inputted by an edge rising signal and an edge falling signal from the edge detection means 22 is processed and, for example, pixel data shown in FIG. 14 is converted to pixel data shown in FIG. 15 and then the result is outputted. The outputted pixel data is stored in the output buffer 17.

As described above, even when an error diffusion method is employed in pseudo-halftone processing, output pixels can be possibly located at positions corresponding to edge positions of the original image if pixel data after the pseudo-halftone processing is subjected to similar processing in the edge processing means 23. Accordingly, in the embodiment as well, actions and effects similar to those in the first embodiment can be achieved.

[Third Embodiment]

In the embodiment, description will be made of a case where a dither method is employed. Incidentally, an overall configuration is basically same as that of the first embodiment, except for a configuration of an edge processing means in FIG. 4, and the edge processing means 43 in the embodiment is adapted for a printer engine whereby 3 value pixels are expressed.

Figures 16, 17, 18:
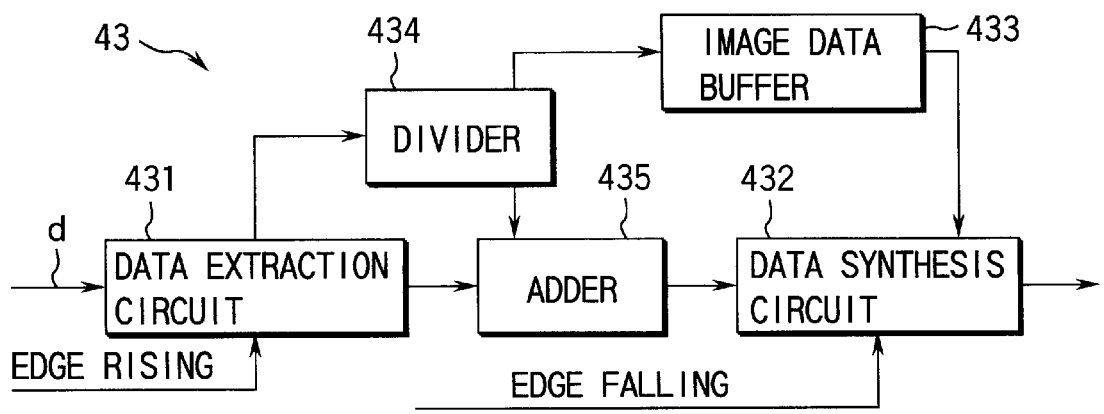
FIG. 16 is a block diagram showing a configuration of an edge processing means in a pseudo-halftone processing section in a third embodiment of the present invention.
FIG. 17 is an illustration of a look-up table of a divider in the edge processing means of the third embodiment.
FIG. 18 is an illustration of an example of pixel data outputted from the edge processing means in the pseudo-halftone processing section of the third embodiment.

The edge processing means 43, as shown in FIG. 16, is constructed by a data extraction circuit 431, a data synthesis circuit 432, a pixel data buffer 433, a divider 434, and an adder 435 and a pixel data d which has finished with the pseudo-halftone processing is supplied to the data extraction circuit 431 from the pseudo-halftone processing means 21. Further, not only is an edge rising signal from the edge detection means 22 supplied to the data extraction circuit 431, but an edge falling signal is also supplied to the data synthesis circuit 432. Therefore, in the data extraction circuit 431, a pixel position at which an edge portion is detected and a pixel data at the same position which has been subjected to the pseudo-halftone processing can be detected.

If there is extent an output pixel other than a density [0] in pixel data, which is located at a pixel position where an edge portion is detected, and which has been subjected to the pseudo-halftone processing, the data extraction circuit 431 supplies the pixel data to the divider 434 and instead, outputs pixel data with a density [0] to the adder 435. Further, when there is no output pixel in pixel data which has been subjected to the pseudo-halftone processing or when an edge rising signal has not occurred, the data extraction circuit 431 supplies pixel data of a density [0] to the divider 434.

The divider 434 is constituted of a look-up table shown in FIG. 17 and an output O1 to the divider 435 and an output O2 to the pixel data buffer 433 are determined for an input based on contents of the table. That is, if the input is a pixel data of a density [0], the outputs O1 and O2 are both pixel data of a density [0], if the input is pixel data of a density [7F], the output O1 is pixel data of a density [0] and the output O2 is pixel data of a density [7F] and if the input is pixel data of a density [FF], the outputs O1 and O2 are both pixel data of a density [7F].

The pixel data buffer 433 stores pixel data from the divider 434.

The adder 435 adds pixel data from the divider 434 and pixel data from the data extraction circuit 431, and outputs the addition result to the data synthesis circuit 432. The data synthesis circuit 432 supplies an output from the adder 435 to the output buffer 17 when an edge falling signal is not inputted from the edge detection means 22. The data synthesis circuit 432 adds pixel data of the pixel data buffer 433 and the data to the output buffer 17 instead of an output of the adder 435 and supplies the added them when an edge falling signal is inputted from the edge detection means 22.

With such a configuration and a function provided, when data of FIG. 5A as an original image is inputted to the pseudo-halftone processing means 21, the data is converted to pixel data shown in FIG. 5B through pseudo-halftone processing using a dither method. Pixel data d which has thus been subjected to the pseudo-halftone processing is inputted to the data extraction circuit 431.

For example, in the case of pixel C-b of FIG. 5B, the pixel corresponds to an original image C-b of FIG. 5A and the edge detection means 22 detects edge rising based on the original image C-b and outputs an edge rising signal. The data extraction circuit 431 detects pixel C-b which has been subjected to pseudo-halftone processing by the edge rising signal. The data extraction circuit 431, however, detects the next pixel data D-b since the pixel C-b which has been subjected to the pseudo-halftone processing is pixel data of a density [0] with no output pixel. Since the pixel data D-b is pixel data of a density [FF], the data extraction circuit 431 outputs not only the pixel data to the divider 434 but pixel data of a density [0] to the adder 435.

The divider 434 divides pixel data of a density [FF] into two pixel data each of a density [7F] according to a look-up table and stores one in the pixel data buffer 433 and supplies the other to the adder 435. Since pixel data of a density [0] has been inputted to the adder 435 from the data extraction circuit 431 at this point, the adder 435 operates addition of 0+7F=7F and outputs pixel data of a density [7F] to the data synthesis circuit 432. Since no edge falling signal is inputted to the data synthesis circuit 432 at this point, the data synthesis circuit 432 supplies pixel data of a density [7F] to the output buffer 17.

While the still next data E-b is pixel data of a density [FF], since no edge rising signal occurs in the edge detection means 22 at this point, the data extraction circuit 431 directly outputs the pixel data of a density [FF] to the adder 435 and further outputs pixel data of a density [0] to the adder 434. Therefore, since data inputted to the adder 435 from the divider 434 is pixel data of a density [0], pixel data of a density [FF] is supplied to the data synthesis circuit 432 from the adder 435.

At this point, since no edge rising signal is inputted to the data synthesis circuit 432, the data synthesis circuit 432 directly outputs pixel data of a density [FF] from the adder 435 to the output buffer 17. Likewise, since the next pixel data F-b is pixel data of a density [0], the data synthesis circuit 432 directly supplies pixel data of a density [0] from the adder 435 to the output buffer 17.

The edge detection means 22 detects edge falling from original image data and outputs an edge falling signal when pixel data H-b is inputted to the data extraction circuit 431. At this point, directly preceding pixel G-b is processed in the data synthesis circuit 232. When an edge falling signal from the edge detection means 22 is inputted to the data synthesis circuit 232, the data synthesis circuit 232 reads pixel data of a density [7F] which is stored in the pixel data buffer 433 and supplies the data [7F] which is attained by adding the image data "0" outputted from adder 435, to the output buffer 17.

Such processing is repeated on each pixel and when the processing on one line of pixels is completed, then processing on the next line gets started. Pixel processing on a new line advances in a direction reverse to that of the processing on the preceding line. That is, the processing on the new line gets started from the pixel position side which is the terminal of the preceding line. In such a way, by alternately reversing a pixel processing direction at a turn between lines, output pixels of [FF] or [7F] can be prevented from being gathered only at one edge.

When such processing is performed, the pseudo-halftone processing section 16 outputs pixel data shown in FIG. 18 with original image data shown in FIG. 5A inputted thereto. That is, pixel data [7F] is obtained at a pixel position of G-b in the b line, pixel data [7F] is obtained at a pixel position of C-c in the c line and pixel data is outputted at a pixel position which coincides with a true edge position of an original image.

In such a way, pixel data which have been subjected to the pseudo-halftone processing in the pseudo-halftone processing section 16 are sequentially stored in the output buffer 17 and when processing on one page is completed, data stored in the output buffer 17 are outputted to the printer engine 4 in a data stream converted in the output format. Therefore, the printer engine 4 drives a print head and performs dot-printing on a sheet of paper.

In the embodiment as well, as described above, since output pixels can be possibly located at positions corresponding to edge positions of an original image, when an original image is subjected to pseudo-halftone processing in the pseudo-halftone processing section 16, edge portions of an original image can be reconstructed with high accuracy and no jaggedness to be conspicuous when printing characters and line images and thereby, a quality of edge printing can be improved. Besides, there arises no necessity to store a tremendous volume of data as in the case of pattern matching.

In the mean time, in the embodiment, while a moving direction of pseudo-halftone processing on pixels of an original image data is alternately reversed for each line in the pseudo-halftone processing section 16, there is no specific limitation to this mode, but a pseudo-halftone processing direction may be reversed at every two line or every three line of pixels: a pseudo-halftone processing direction may be reversed regularly at any frequency of every one and every more than one line.

While the pseudo-halftone processing in the embodiment employs a dither method, pseudo-halftone processing using a error diffusion method which is described in the second embodiment can naturally be applied to the embodiment.

Further, while application of the present invention to a printer engine which is capable of expressing a print in three values is described in the embodiment, applications is not necessarily limited to this case, but a printer engine with four or more values can be an object of the application by changing data contents of the look-up table of the divider 434.

[Fourth Embodiment]

In the embodiment, when data extraction means stores data of output pixels each with a density other than 0 in a pixel data buffer, an image processing device which outputs the same pixel data as pixel data at a pixel position at which the data is stored in the pixel data buffer to a data synthesis means will be described. Incidentally, an overall configuration of hardware is basically same as in the first embodiment. What is different is in a configuration is the data extraction circuit shown in the FIG. 6.

Figure 19:
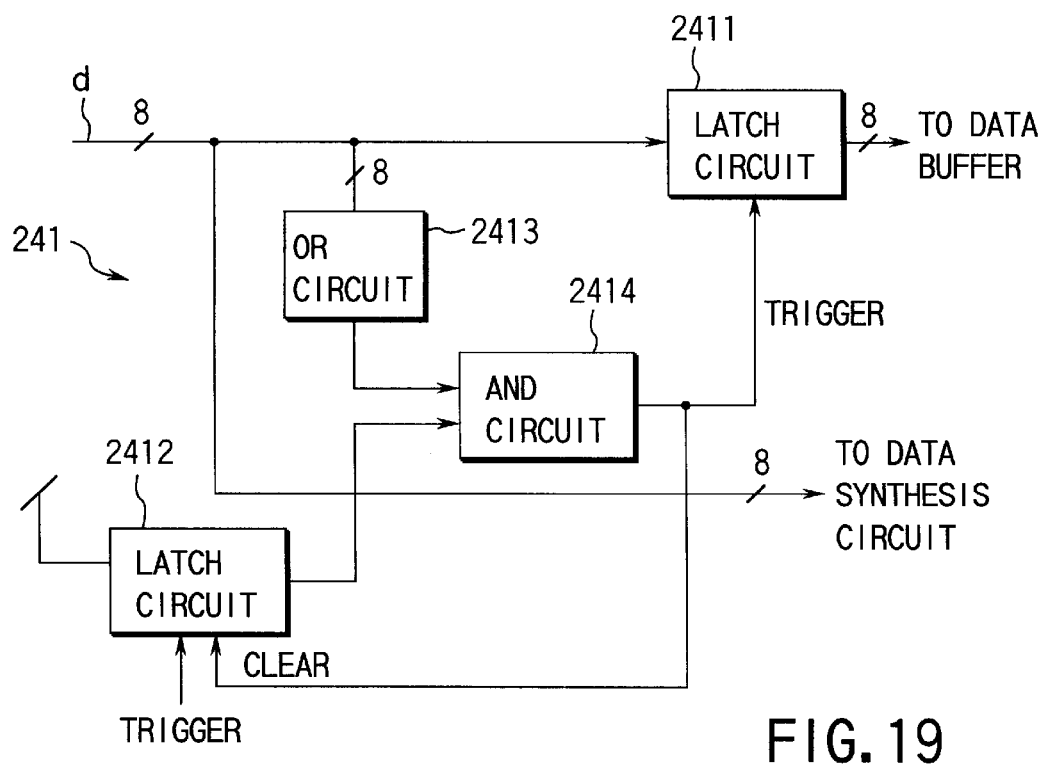
FIG. 19 is a block diagram showing a configuration of a data extraction circuit in a fourth embodiment of the present invention.

A data extraction circuit 241 in the embodiment, as shown in FIG. 19, comprises: a latch circuit 2411 to which pixel data d which has been subjected to pseudo-halftone processing is inputted, a latch circuit 2412 which uses an edge rising signal as a trigger, an OR circuit 2413, and an AND circuit 2414. Inputted pixel data d which has been subjected to pseudo-halftone processing is not only inputted to the latch circuit 2411, but also outputted to the data synthesis circuit 232 and further inputted to the OR circuit 2413. When the latch circuit 2412 has received an edge rising signal, the latch circuit 2412 outputs a signal indicating detection of an edge of an original image to the AND circuit 2414 with the edge rising signal as a trigger.

Accordingly, when the latch circuit 2412 receives an edge rising signal and pixel data of a density other than [0] is inputted to the OR circuit 2413, an AND is calculated in the AND circuit 2414 from outputs of the latch circuit 2412 and the OR circuit 2413, a trigger is supplied to the latch circuit 2411 from the AND circuit 2414 and thereby, the latch circuit 2411 outputs pixel data d inputted to the circuit 2411 to the pixel data buffer 233.

Therefore, for example, when a pixel [1A] of C-b of FIG. 5A as an original image is inputted to the pseudo-halftone processing means 21 and the edge detection means 22, the pixel [1A] of C-b of FIG. 5A is converted to a pixel [0] of C-b of FIG. 5B and the result is inputted to the data extraction circuit 241 of the edge processing means 23. At the same time, edge rising is detected in the edge detection means 22 and an edge rising signal is inputted to the data extraction circuit 241.

The data extraction circuit 241 inputs an edge rising signal to the latch circuit 2412 as a trigger and a signal which notifies detection of an edge of an original image is outputted to the AND circuit 2414 from the latch circuit 2412.

At this point, pixel data C-b at an edge position of the original image which has been subjected to the pseudo-halftone processing is directly outputted to the data synthesis circuit 232 and at the same time, the pixel data is supplied to the latch circuit 2411 and the OR circuit 2413 as well. However, since the pixel data C-b is [0], a signal is not outputted to the AND circuit 2414 from the OR circuit 2413 and therefore a trigger is not supplied to the latch circuit 2411 from the AND circuit 2414. Accordingly, no pixel data is outputted to the image data buffer 233 from the latch circuit 2411.

Since the next image data D-b is an output [FF], a signal is outputted to the AND circuit 2414 from the OR circuit 2413. Thereby, a trigger is supplied to the latch circuit 2411 from the AND circuit 2414 and pixel data is outputted to the pixel data buffer 233 from the latch circuit 2411. At the same time, the latch circuit 2412 is cleared by an output of the AND circuit 2414.

Therefore, in the embodiment as well, since output pixels can be possibly located at positions corresponding to edge positions of an original image, when an original image is subjected to pseudo-halftone processing in the pseudo-halftone processing section 16, a quality of edge printing can be improved with no jaggedness of an edge to be conspicuous when printing characters and line images as in the above described embodiments.

[Fifth Embodiment]

The fifth embodiment is different from the above described embodiments in that the fifth embodiment adopts a configuration and a function in which the image data buffer 233 as an edge processing means is not employed. A configuration of the other hardware is basically same as that of the first embodiment.

Figure 20:
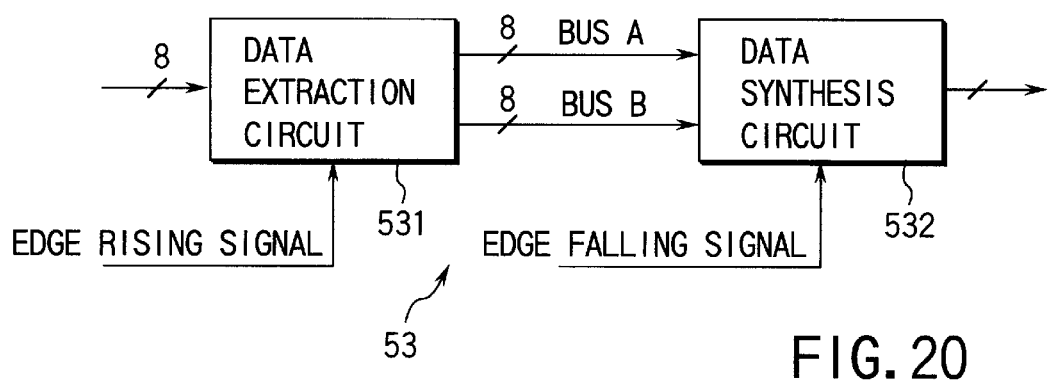
FIG. 20 is a block diagram showing a configuration of an edge processing means in a fifth embodiment of the present invention.

The edge processing means 53 in the embodiment, as shown in FIG. 20, comprises: a data extraction circuit 531, and a data synthetic circuit 532 both with the same configuration as that in the fourth embodiment, wherein both circuits are electrically connected by the bus lines A and B. While the data extraction circuit 531, as shown in FIG. 19, is constructed of two latch circuits 2411 and 2412, an OR circuit 2413, and an AND circuit 2414, in the data extraction circuit 531 a direct output of pixel data to the data synthesis circuit 532 is effected by way of the bus B and pixel data is outputted to the data synthesis circuit 232 by way of the bus A instead of an output of the pixel data to the pixel data buffer 233 from the latch circuit 2411.

Figure 21:
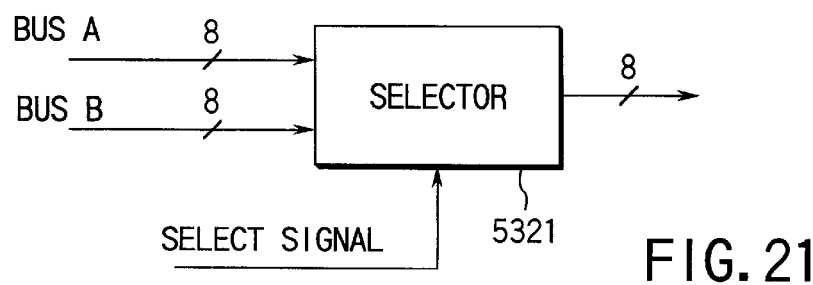
FIG. 21 is a block diagram showing a configuration of a data synthesis circuit in the fifth embodiment.

The data synthesis circuit 532, as shown in FIG. 21, is constituted of a selector 5321 and when no edge falling signal is detected, the bus B is selected according to a select signal while when an edge falling signal is detected, the bus A is selected according to a select signal.

In the data extraction circuit 531 with such a configuration, pixel data d, which has been inputted from the pseudo-halftone processing means 21, and which has been subjected to the pseudo-halftone processing, is always outputted to the data synthesis circuit 532 by way of the bus B. When an edge rising signal is received, the latch circuit 2412 outputs a signal which indicates detection of an edge of the original image to the AND circuit 2414 with the edge rising signal as a trigger. Further, when pixel data d of a density other than [0] is inputted, the OR circuit 2413 output a signal to the AND circuit 2414.

Therefore, when pixel data d of a density other than [0] which has been subjected to the pseudo-halftone processing is inputted and an edge rising signal is received, an AND is performed in the AND circuit 2414 from an output of the latch circuit 2412 and an output of the OR circuit 2413 and a trigger is supplied to the latch circuit 2411 from the AND circuit 2414 and thereby, the latch circuit 2411 outputs the inputted pixel data d to the data synthesis circuit 532 by way of the bus A.

Therefore, for example, when a pixel [1A] of C-b of FIG. 5A is inputted to the pseudo-halftone processing means 21 and the edge detection means 22 as an original image, the pixel [1A] of C-b of FIG. 5A is converted to a pixel [0] of C-b of FIG. 5B in the pseudo-halftone processing means 21 and the pixel [0] of C-b of FIG. 5B is inputted to the data extraction circuit 531 of the edge processing means 53. At the same time, edge rising is detected in the edge detection means 22 and an edge rising signal is inputted to the data extraction circuit 531. The data extraction circuit 241 inputs the edge rising signal to the data extraction circuit 2412 as a trigger and a signal which notifies detection of an edge of an original image is outputted to the AND circuit 2414 from the latch circuit 2412.

At this point, pixel data C-b at an edge position of the original image which has been subjected to the pseudo-halftone processing is outputted to the data synthesis circuit 232 by way of the bus B and at the same time, the pixel data C-b is also supplied to the latch circuit 2411 and the OR circuit 2413. However, since the pixel data is [0], a signal is not outputted to the AND circuit 2414 from the OR circuit 2413 and a trigger is not supplied to the latch circuit 2411 from the AND circuit 2414. Accordingly, the pixel data is not supplied to the bus A from the latch circuit 2411.

Since the next pixel data D-b is an output pixel [FF], a signal is outputted to the AND circuit 2414 from the OR circuit 2413. Thereby, a trigger is supplied to the latch circuit 2411 from the AND circuit 2414 and pixel data is supplied to the bus A from the latch circuit 2411. At the same time, the latch circuit 2412 is cleared by an output of the AND circuit 2414.

Thereafter, the edge processing means 53 performs processing on pixels while sequentially moving from one pixel position to the next and when processing moves from a pixel G-b to a pixel H-b of the original image, an edge falling signal is supplied to the data synthesis circuit 532 from the edge detection circuit 22. By this edge falling signal, the selector 5321 switches an input from the bus B to the bus A. At this point, while pixel data of the bus B is [00], pixel data of the bus A is [FF], and therefore, pixel data [FF] is outputted from the data synthesis circuit 532.

Therefore, in the embodiment as well, since output pixels can be possibly located at positions corresponding to edge positions of an original image, when an original image is subjected to pseudo-halftone processing in the pseudo-halftone processing section 16, a quality of edge printing can be improved with no jaggedness of an edge to be conspicuous when printing characters and line images as in the above described embodiments.

[Sixth Embodiment]

This embodiment is a modification of the third embodiment. While, in FIG. 16, when the data extraction circuit 431 stores an output pixel of a density other than [0] in the pixel data buffer 433, pixel data at a pixel position where the output pixel is stored is converted to pixel data of a density other than [0] and the result is outputted to the adder 435, in the embodiment when the data extraction circuit 431 stores an output pixel of a density other than [0] in the pixel data buffer, the same pixel data as the pixel data at a pixel position where the output pixel is stored is outputted to the adder. Therefore, the embodiment has the same configuration and function as the third embodiment in the edge processing means except for a configuration of the data extraction circuit. Incidentally, the data extraction circuit employed in the embodiment is the same as that of the data extraction circuit 241 shown in FIG. 19, which is employed in the fourth embodiment, however, with the exception that a direct output to the data synthesis circuit is an output to the adder 435 and an output to the pixel data buffer 433 is an output to the divider 434.

In such an configuration, pixel data d, which has been subjected to the pseudo-halftone processing, and which has been inputted from the pseudo-halftone processing means 21 are always outputted to the adder 435. When an edge rising signal is received, the signal is inputted to the latch circuit 2412 as trigger and a signal indicating detection of an edge of an original image is outputted to the AND circuit 2414. On the other hand, the pixel data d which has been subjected to the pseudo-halftone processing is inputted to the OR circuit 2413. The OR circuit 2413 output a signal to the AND circuit 2414 when the pixel data d includes an output pixel, that is, when the pixel data d is pixel data of a density other than [0].

Therefore, when the pixel data d, which has a density other than [0], and which has been subjected to the pseudo-halftone processing, is inputted and an edge rising signal is received, the data extraction circuit outputs the pixel data to the adder 435. Further, an AND is performed in the AND circuit 2414 from an output of the latch circuit 2412 and an output of the OR circuit 2413, a trigger is supplied to the latch circuit 2411 from the AND circuit 2414 and thereby, the latch circuit 2411 outputs the inputted pixel data to the divider 434.

Therefore, for example, when a pixel [1A] of C-b of FIG. 5A is inputted to the pseudo-halftone processing means 21 and the edge detection means 22 as an original image, the pixel [1A] of C-b of FIG. 5A is converted to a pixel [0] of C-b of FIG. 5B and the result is inputted to the data extraction circuit 241 of the edge processing means 23. At the same time, edge rising is detected in the edge detection means 22 and the edge rising signal is inputted to the data extraction circuit 241. The data extraction circuit 241 inputs the edge rising signal to the latch circuit 2412 as a trigger and a signal indicating detection of an edge of an original image is outputted to the AND circuit 2414 from the latch circuit 2412.

At this point, the pixel data C-b at an edge position of the original image which has been subjected to the pseudo-halftone processing is outputted to the adder 435 and at the same time, the pixel data C-b is also supplied to the latch circuit 2411 and the OR circuit 2413. However, since the pixel data is [0], no signal is outputted to the AND circuit 2414 from the OR circuit 2413 and a trigger is not supplied to the latch circuit 2411 from the AND circuit 2414. Therefore, no pixel data is outputted to the divider 434 from the latch circuit 2411.

The next pixel data D-b is outputted to the adder 435 as well. Since the next pixel data D-b is an output pixel [FF], a signal is outputted to the AND circuit 2414 from the OR circuit 2413. Thereby, a trigger is supplied to the latch circuit 2411 from the AND circuit 2414 and the pixel data is outputted to the divider 434 from the latch circuit 2411. At the same time, the latch circuit 2412 is cleared by an output of the AND circuit 2414.

The divider 434 divides pixel data of a density [FF] into two pixel data each of a density [7F] according to a look-up table of FIG. 17 and stores one pixel data in the image data buffer 433 and supplies the other pixel data to the adder 435. The adder 435 operates addition of FF+7F=17F since pixel data of a density [FF] is inputted to the adder 435 from the data extraction circuit at this point. However, since FF is the highest density and no density higher than FF is available, the adder 435 must output pixel data of a density [FF] to the data synthesis circuit 432. In the data synthesis circuit 432, since no edge falling signal is not inputted at this point, the pixel data of a density [FF] is supplied to the output buffer 17.

Thereafter, the edge processing means continues to perform processing while sequentially moving processing from one pixel position to the next. When processing moves from a pixel G-b to a pixel H-b of an original image shown in FIG. 5A, an edge falling signal is supplied to the data synthesis circuit 432 from the edge detection means 22. By the edge falling signal, the data synthesis circuit 432 reads pixel data of a density [7F] stored in the pixel data buffer 433 and outputs the data [7F] which is attained by adding the image data "0" outputted from adder 435.

Figures 22, 23, 24:
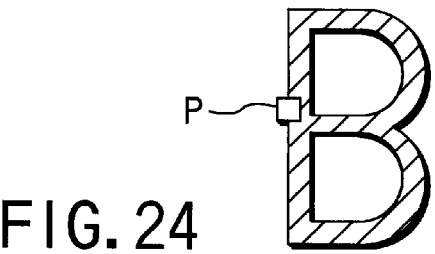
FIG. 22 is an illustration of pixel data outputted from an edge processing means of a pseudo-halftone processing section in a sixth embodiment of the present invention.
FIG. 23 is an illustration of an example of a dither pattern used in pseudo-halftone processing.
FIG. 24 is an illustration of an example of a characters developed to a bitmap.

When such a processing is performed, the pseudo-halftone processing section 16 of the image processing section 3 inputs original image data shown in FIG. 5A to the edge processing means and outputs pixel data shown in FIG. 22 therefrom. Therefore, in the embodiment as well, as described above since output pixels can be possibly located at positions corresponding to edge positions of an original image, when an original image is subjected to pseudo-halftone processing in the pseudo-halftone processing section 16, a quality of edge printing can be improved with no jaggedness of an edge to be conspicuous when printing characters and line images as in the above described embodiments.

According to the present invention, there is no necessity to store a tremendous volume of data as in the case of pattern matching and the present invention can be applied to pseudo-halftone processing using not only a dither method but a error diffusion method with the result of improvement of its versatility in application and besides, a quality of edge printing of characters and line image after pseudo-halftone processing can be increased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   detection means for detecting an edge from pixel data having a given first number of tone levels;
   first processing means for performing pseudo-halftone processing of the pixel data to output pseudo-halftone data having a second number of tone levels lower than the first number of tone levels; and
   synthesis means for, when the detected edge is a falling edge, synthesizing pixel data based on the pseudo-halftone data outputted by the first processing means with the pseudo-halftone data at positions corresponding to the edge which is detected by the detection means to output the pseudo-halftone data having pixels distributed over the positions corresponding to the detected edge of the pixel data;
   wherein the synthesis means includes:
      storage means for storing the pseudo-halftone data outputted by the first processing means in a storage region in a case where the pseudo-halftone data has a density other than 0; and
      means for receiving continuously the pseudo-halftone data supplied from the first processing means and synthesizing the pseudo-halftone data which is stored by the storage means with the supplied pseudo-halftone data to output the pseudo-halftone data having pixels distributed over the positions corresponding to the detected edge of the pixel data.

2. An image processing apparatus comprising:
   detection means for detecting an edge from pixel data having a given first number of tone levels;
   first processing means for performing pseudo-halftone processing of the pixel data to output pseudo-halftone data having a second number of tone levels lower than the first number of tone levels; and
   synthesis means for, when the detected edge is a falling edge, synthesizing pixel data based on the pseudo-halftone data outputted by the first processing means with the pseudo-halftone data at positions corresponding to the edge which is detected by the detection means to output the pseudo-halftone data having pixels distributed over the positions corresponding to the detected edge of the pixel data;
   wherein the synthesis means includes:
      storage means for storing the pseudo-halftone data outputted by the first processing means in a storage region after the detection means detects a rising edge in a case where the pseudo-halftone data has a density other than 0; and
      means for receiving the pseudo-halftone data supplied from the first processing means and synthesizing the pseudo-halftone data which is stored in the storage means with the supplied pseudo-halftone data to output the pseudo-halftone data having pixels distributed over the positions corresponding to the edge of the pixel data.

3. An image processing apparatus comprising:
   detection means for detecting an edge from pixel data having a given first number of tone levels;
   first processing means for performing pseudo-halftone processing of the pixel data to output pseudo-halftone data having a second number of tone levels lower than the first number of tone levels; and
   synthesis means for, when the detected edge is a falling edge, synthesizing pixel data based on the pseudo-halftone data outputted by the first processing means with the pseudo-halftone data at positions corresponding to the edge which is detected by the detection means to output the pseudo-halftone data having pixels distributed over the positions corresponding to the detected edge of the pixel data;
   wherein the synthesis means includes:
      second processing means for receiving continuously the pseudo-halftone data from the first processing means and outputting the pseudo-halftone data directly outputted by the first processing means after the detection means detects a rising edge in a case where the pseudo-halftone data has a density of 0, and for storing the pseudo-halftone data outputted by the first processing means in a storage region and also outputting the pseudo-halftone data with a value when being stored as 0 after the detection means detects a rising edge in a case where the pseudo-halftone data has a density other than 0; and means for receiving continuously the pseudo-halftone data outputted by the second processing means and synthesizing the pseudo-halftone data which is stored by the second processing means with the pseudo-halftone data received from the second processing means to output the pseudo-halftone data having pixels distributed over the positions corresponding to the detected edge of the pixel data.

4. An image processing apparatus comprising:

detection means for detecting an edge from pixel data having a given first number of tone levels;

first processing means for performing pseudo-halftone processing of the pixel data to output pseudo-halftone data having a second number of tone levels lower than the first number of tone levels; and synthesis means for, when the detected edge is a falling edge, synthesizing pixel data based on the pseudo-halftone data outputted by the first processing means with the pseudo-halftone data at positions corresponding to the edge which is detected by the detection means to output the pseudo-halftone data having pixels distributed over the positions corresponding to the detected edge of the pixel data;

wherein the synthesis means includes:

second processing means for receiving continuously the pseudo-halftone data from the first processing means and outputting the pseudo-halftone data directly outputted by the first processing means after the detection means detects a rising edge in a case where the pseudo-halftone data has a density of 0, and for converting the pseudo-halftone data outputted by the first processing means to prescribed first data on a first predetermined condition and also outputting the result, and at the same time converting the pseudo-halftone data to prescribed second data on a second predetermined condition and also storing the result in a storage region after the detection means detects a rising edge in a case where the pseudo-halftone data has a density other than 0; and means for receiving continuously one of the pseudo-halftone data and the first prescribed data outputted by the second processing means and synthesizing the prescribed second data stored in the storage region with the prescribed second data received from the second processing means to output the pseudo-halftone data having pixels distributed over the positions corresponding to the detected edge of the pixel data.

5. An image processing apparatus comprising:

detection means for detecting an edge from pixel data having a given first number of tone levels;

first processing means for performing pseudo-halftone processing of the pixel data to output pseudo-halftone data having a second number of tone levels lower than the first number of tone levels; and synthesis means for, when the detected edge is a falling edge, synthesizing pixel data based on the pseudo-halftone data outputted by the first processing means with the pseudo-halftone data at positions corresponding to the edge which is detected by the detection means to output the pseudo-halftone data having pixels distributed over the positions corresponding to the detected edge of the pixel data;

wherein the synthesis means includes:

second processing means for receiving continuously the pseudo-halftone data from the first processing means and outputting the pseudo-halftone data directly outputted by the first processing means after the detection means detects a rising edge in a case where the pseudo-halftone data has a density of 0, and for directly outputting the pseudo-halftone data outputted by the first processing means and also at the same time storing a value of the data outputted in a storage region after the detection means detects a rising edge in a case where the pseudo-halftone data has a density other than 0; and means for receiving continuously the pseudo-halftone data outputted by the second processing means and synthesizing the pseudo-halftone data which is stored by the second processing means with the pseudo-halftone data received from the second processing means to output the pseudo-halftone data having pixels distributed over the positions corresponding to the detected edge of the pixel data.

6. An image processing apparatus comprising:

detection means for detecting an edge from pixel data having a given first number of tone levels;

first processing means for performing pseudo-halftone processing of the pixel data to output pseudo-halftone data having a second number of tone levels lower than the first number of tone levels; and synthesis means for, when the detected edge is a falling edge, synthesizing pixel data based on the pseudo-halftone data outputted by the first processing means with the pseudo-halftone data at positions corresponding to the edge which is detected by the detection means to output the pseudo-halftone data having pixels distributed over the positions corresponding to the detected edge of the pixel data;

wherein the synthesis means includes:

a data extraction circuit for receiving continuously the pseudo-halftone data from the first processing means and outputting the pseudo-halftone data directly outputted by the first processing means after the detection means detects a rising edge in a case where the pseudo-halftone data has a density of 0, and for latching a density value of the pseudo-halftone data outputted by the first processing means using a latch circuit and also outputting the density value of the pseudo-halftone data when being latched as 0 after the detection means detects a rising edge in a case where the pseudo-halftone data has a density other than 0; and a data synthesis circuit for receiving continuously the pseudo-halftone data outputted by the data extraction circuit and selecting the pseudo-halftone data which is latched by the data extraction circuit to output the pseudo-halftone data having pixels distributed over the positions corresponding to the detected edge of the pixel data.

7. An image processing apparatus comprising:

detection means for detecting an edge from pixel data having a given first number of tone levels;

first processing means for performing pseudo-halftone processing of the pixel data to output pseudo-halftone data having a second number of tone levels lower than the first number of tone levels; and synthesis means for, when the detected edge is a falling edge, synthesizing pixel data based on the pseudo-halftone data outputted by the first processing means with the pseudo-halftone data at positions corresponding to the edge which is detected by the detection means to output the pseudo-halftone data having pixels distributed over the positions corresponding to the detected edge of the pixel data;

wherein the synthesis means includes:

second processing means for receiving continuously the pseudo-halftone data from the first processing means and outputting the pseudo-halftone data directly outputted by the first processing means after the detection means detects a rising edge in a case where the pseudo-halftone data has a density of 0, and for converting the pseudo-halftone data outputted by the first processing means to prescribed first data on a first predetermined condition and also outputting synthetic data of the conversion result with the pseudo-halftone data before the conversion, and in addition for converting the pseudo-halftone data to prescribed second data on a second predetermined condition and also storing the result in a storage region after the detection means detects a rising edge in a case where the pseudo-halftone data has a density other than 0; and means for receiving continuously one of the pseudo-halftone data and the synthetic data outputted by the second processing means and synthesizing the prescribed second data stored by the second processing means with the pseudo-halftone data received from the second processing means to output the pseudo-halftone data having pixels distributed over the positions corresponding to the detected edge of the pixel data.

8. An image processing method comprising the steps of:

detecting an edge from pixel data having a given first number of tone levels;

performing a first processing of the pixel data to output pseudo-halftone data having a second number of tone levels lower than the first number of tone levels; and synthesizing pixel data, when the detected edge is a falling edge, based on the pseudo-halftone data outputted by the first processing step with the pseudo-halftone data at positions corresponding to the detected edge to output the pseudo-halftone data having pixels distributed over the positions corresponding to the detected edge of the pixel data;

wherein the synthesis step includes:

a storage step of storing the pseudo-halftone data outputted by the first processing step, in a storage region in a case where the pseudo-halftone data has a density other than 0; and a step of receiving continuously the pseudo-halftone data supplied from the first processing step and synthesizing the pseudo-halftone data which is stored in the storage step with the supplied pseudo-halftone data to output the pseudo-halftone data having pixels distributed over the positions corresponding to the detected edge of the pixel data.

9. An image processing method comprising the steps of:

detecting an edge from pixel data having a given first number of tone levels;

performing a first processing of the pixel data to output pseudo-halftone data having a second number of tone levels lower than the first number of tone levels; and synthesizing pixel data, when the detected edge is a falling edge, based on the pseudo-halftone data outputted by the first processing step with the pseudo-halftone data at positions corresponding to the detected edge to output the pseudo-halftone data having pixels distributed over the positions corresponding to the detected edge of the pixel data;

wherein the synthesis step includes:

a storage step of storing the pseudo-halftone data outputted by the first processing step in a storage region after a rising edge is detected in a case where the pseudo-halftone data has a density other than 0; and a step of receiving continuously the pseudo-halftone data supplied from the first processing step and synthesizing the pseudo-halftone data which is stored in the storage step with the supplied pseudo-halftone data to output the pseudo-halftone data having pixels distributed over the positions corresponding to the detected edge of the pixel data.

10. An image processing method comprising the steps of:

detecting an edge from pixel data having a given first number of tone levels;

performing a first processing of the pixel data to output pseudo-halftone data having a second number of tone levels lower than the first number of tone levels; and synthesizing pixel data, when the detected edge is a falling edge, based on the pseudo-halftone data outputted by the first processing step with the pseudo-halftone data at positions corresponding to the detected edge to output the pseudo-halftone data having pixels distributed over the positions corresponding to the detected edge of the pixel data;

wherein the synthesis step includes:

a second processing step of receiving continuously the pseudo-halftone data from the first processing step and outputting the pseudo-halftone data directly outputted by the first processing step after a rising edge is detected in a case where the pseudo-halftone data has a density of 0, and of storing the pseudo-halftone data outputted by the first processing step in a storage region and also outputting the pseudo-halftone data with a value when being stored as 0 after a rising edge is detected in a case where the pseudo-halftone data has a density other than 0; and a step of receiving continuously the pseudo-halftone data outputted by the second processing step and synthesizing the pseudo-halftone data which is stored in the second processing step with the pseudo-halftone data received from the second processing step to output the pseudo-halftone data having pixels distributed over the positions corresponding to the detected edge of the pixel data.

11. An image processing method comprising the steps of:

detecting an edge from pixel data having a given first number of tone levels;

performing a first processing of the pixel data to output pseudo-halftone data having a second number of tone levels lower than the first number of tone levels; and synthesizing pixel data, when the detected edge is a falling edge, based on the pseudo-halftone data outputted by the first processing step with the pseudo-halftone data at positions corresponding to the detected edge to output the pseudo-halftone data having pixels distributed over the positions corresponding to the detected edge of the pixel data;

wherein the synthesis step includes:

a second processing step of receiving continuously the pseudo-halftone data from the first processing step and outputting the pseudo-halftone data directly outputted by the first processing step after a rising edge is detected in a case where the pseudo-halftone data has a density of 0, and of converting the pseudo-halftone data outputted by the first processing step to prescribed first data on a first predetermined condition and also outputting the result, and at the same time converting the pseudo-halftone data to prescribed second data on a second predetermined condition and also storing the result in a storage region after a rising edge is detected in a case where the pseudo-halftone data has a density other than 0; and a step of receiving continuously one of the pseudo-halftone data and the first prescribed data outputted by the second processing step and synthesizing the prescribed second data stored in the storage region with the pseudo-halftone data received from the second processing step to output the pseudo-halftone data having pixels distributed over the positions corresponding to the detected edge of the pixel data.

12. An image processing method comprising the steps of:

detecting an edge from pixel data having a given first number of tone levels;

performing a first processing of the pixel data to output pseudo-halftone data having a second number of tone levels lower than the first number of tone levels; and synthesizing pixel data, when the detected edge is a falling edge, based on the pseudo-halftone data outputted by the first processing step with the pseudo-halftone data at positions corresponding to the detected edge to output the pseudo-halftone data having pixels distributed over the positions corresponding to the detected edge of the pixel data;

wherein the synthesis step includes:

a second processing step of receiving continuously the pseudo-halftone data from the first processing step and outputting the pseudo-halftone data directly outputted by the first processing step after a rising edge is detected in a case where the pseudo-halftone data has a density of 0, and of outputting the pseudo-halftone data directly outputted by the first processing step and also at the same time storing a value of the data outputted in a storage region in a case where the pseudo-halftone data has a density other than 0; and a step of receiving continuously the pseudo-halftone data outputted by the second processing step and synthesizing the pseudo-halftone data which is stored in the second processing step with the pseudo-halftone data received from the second processing step to output the pseudo-halftone data having pixels distributed over the positions corresponding to the detected edge of the pixel data.

13. An image processing method comprising the steps of:

detecting an edge from pixel data having a given first number of tone levels;

performing a first processing of the pixel data to output pseudo-halftone data having a second number of tone levels lower than the first number of tone levels; and synthesizing pixel data, when the detected edge is a falling edge, based on the pseudo-halftone data outputted by the first processing step with the pseudo-halftone data at positions corresponding to the detected edge to output the pseudo-halftone data having pixels distributed over the positions corresponding to the detected edge of the pixel data;

wherein the synthesis step includes:

a data extraction step of receiving continuously the pseudo-halftone data from the first processing step and outputting the pseudo-halftone data directly outputted by the first processing step after a rising edge is detected in a case where the pseudo-halftone data has a density of 0, and of latching a density value of the pseudo-halftone data outputted by the first processing step and also outputting the density value of the pseudo-halftone data when being latched as 0 after a rising edge is detected in a case where the pseudo-halftone data has a density other than 0; and a data synthesis step of receiving continuously the pseudo-halftone data outputted by the data extraction step and selecting the pseudo-halftone data which is latched by the data extraction step to output the pseudo-halftone data having pixels distributed over the positions corresponding to the detected edge of the pixel data.

14. An image processing method comprising the steps of:

detecting an edge from pixel data having a given first number of tone levels;

performing a first processing of the pixel data to output pseudo-halftone data having a second number of tone levels lower than the first number of tone levels; and synthesizing pixel data, when the detected edge is a falling edge, based on the pseudo-halftone data outputted by the first processing step with the pseudo-halftone data at positions corresponding to the detected edge to output the pseudo-halftone data having pixels distributed over the positions corresponding to the detected edge of the pixel data;

wherein the synthesis step includes:

a second processing step of receiving continuously the pseudo-halftone data from the first processing step and outputting the pseudo-halftone data directly outputted by the first processing step after a rising edge is detected in a case where the pseudo-halftone data has a density of 0, and of converting the pseudo-halftone data outputted by the first processing step to prescribed first data on a first predetermined condition and also outputting synthetic data of the conversion result with the pseudo-halftone data before the conversion, and in addition converting the pseudo-halftone data to a prescribed second data on a second predetermined condition and also storing the result in a storage region after a rising edge is detected in a case where the pseudo-halftone data has a density other than 0; and a second synthesis step of receiving continuously one of the pseudo-halftone data and the synthetic data outputted by the second processing step and synthesizing the prescribed second data which is stored in the second processing step with the pseudo-halftone data received from the second processing step to output the pseudo-halftone data having pixels distributed over the positions corresponding to the detected edge of the pixel data.

* * * * *